Sept. 10, 1974 R. M. KLEIN 3,834,883

ENCAPSULATION FOR LIGHT-EMITTING DIODES

Filed Nov. 20, 1972

United States Patent Office 3,834,883

Patented Sept. 10, 1974

3,834,883

ENCAPSULATION FOR LIGHT-EMITTING DIODES

Richard M. Klein, Framingham, Mass., assignor to GTE Laboratories Incorporated, Waltham, Mass.

Filed Nov. 20, 1972, Ser. No. 308,228
Int. Cl. C03c *3/00, 27/00*
U.S. Cl. 65—32 16 Claims

ABSTRACT OF THE DISCLOSURE

An optical semiconductor device including an electroluminescent diode mounted on a support so that radiation from the diode is emitted away from the support. A glass dome is mounted on the support and covers the diode so as to be in intimate contact with the diode. The radiation emitted from the diode passes through the glass dome so as to improve the external emission efficiency of the device.

The optical semiconductor device is made by mounting the electroluminescent diode on a support and then forming a glass dome over the diode with the glass dome being in intimate contact with and fused to the diode, the glass dome being formed of a translucent partially devetrified phase-separated chalcogenide glass from the As-Br-S system. The translucent chalcogenide glass is prepared in evacuated sealed ampoules and after being applied to the diode the glass is heat treated to enhance the phase-separation process.

BACKGROUND OF THE INVENTION

The present invention relates to the field of optical semi-conductor devices and more particularly to an electroluminescent diode of improved efficiency and methods for making the same.

It is well known that electroluminescence is exhibited in the vicinity of a PN junction which is biased so as to inject charge carriers of one type into a region where the predominant charge carriers are of opposite type. Light is emitted in conjunction with the recombination of pairs of oppositely charged carriers.

Electroluminescent diodes are generally formed of single crystal wafers of the group II–V materials, such as GaAs, $GaAs_{1-z}P_z$ and $Al_zGa_{1-z}As$ having a PN junction therein. The electroluminescent light that is generated by the recombination of pairs of oppositely charged carriers in the single crystal wafers has great difficulty escaping the crystal. Since the crystals have high indices of refraction, generally about 3.5, and are usually in the shape of rectangular parallelepipedons, internal total reflection permits only light of a narrow cone of about 16° opening angle to be transmitted through the surface. This is only a few percent of the emitted light. The rest is totally reflected from surface to surface until it is finally absorbed inside the crystal or by the dark electrodes, or until it finds an irregularity in the surface of the crystal so that it can finally escape.

Heretofore attempts have been made to overcome this loss mechanism. One method used has been to shape the crystal in the form of a hemisphere with the light-emitting junction located at the flat bottom surface of the hemisphere. Although this construction has achieved a substantial increase in the emitted light, it has a number of disadvantages. One disadvantage is that the wafer must be shaped by grinding and polishing. This is both a costly and time consuming operation and therefore not well suited for large scale production. Another disadvantage arises from the need to use excessively thick wafers as a starting material. A preferred method of making an electroluminescent diode is to epitaxially form a thin layer of the semiconductor material on a thick substrate. The epitaxial layer of such diodes is too thin for shaping, and the substrate strongly absorbs emission from the higher energy gap epitaxial layer. Another method which has been used to increase the light emission from electroluminescent diodes is to form a hemispherial dome of a transparent organic material over the diode. However, this technique has the disadvantage that the low refractive index of the organic material, generally not greater than 1.8, limits the efficiency improvement achieved.

Optical semiconductor devices including electroluminescent semiconductor diodes have been constructed with glass domes covering and in intimate contact with the diode so that radiation emitted from the diode passes through the dome; see for example U.S. Pat. No. 3,596,-136 issued July 27, 1971. Several problems have been encountered in manufacturing and using such glass domed diodes due to the brittle nature of the glass involved. Oftentimes, these domes would fracture when exposed to wide variations of temperature. Further, maximum efficiency was not achieved by using such transparent glasses used in the field.

SUMMARY OF INVENTION

In accordance with features of the present invention, a phase-separated chalcogenide glass from the arsenic-bromide-sulphur system is prepared by firing the constituents in evacuated sealed ampoules. The composition of the glass is controlled in order to produce a phase-separated glass which is translucent in appearance. The glass thus formed is applied to the optical semiconductor and heat treated to enhance the phase-separation process.

The formation of phase-separated chalcogenide glass is not well understood; however, it has been shown that such glass produces a higher index of refraction. The higher index of refraction produces a more efficient optical system when used with electroluminescent devices which incorporate crystals having a high index of refraction. The phase-separated chalcogenide glasses also exhibit a ductile quality with Vickers hardness of about 13. The ductile quality permits bonding between the glass encapsulant and the diode to be performed at lower temperatures as well as preventing therma stresses which may cause catastrophic failure of the encapsulated diode. Further features and advantages of the invention will become more readily apparent from the following detailed description of a specific embodiment of the invention when taken in conjunction with the accompanying drawings. In the several figures like reference numerals identify like elements.

DESCRIPTION OF THE PREFERRED EMBODIMENT

Figure 1:
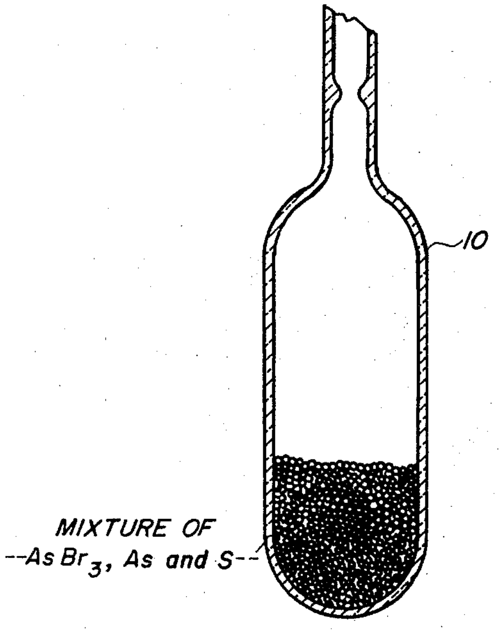
FIG. 1 is a schematic view of an apparatus for making the glass used to make the optical semiconductor device in accordance with the present invention.

Attention is directed to FIG. 1, wherein the apparatus for producing the phase-separated chalcogenide glass is illustrated. Three basic properties required of chalcogenide glasses to be used for encapsulation of light-emitting diodes are a high index of refraction, low optical absorption for the emitted radiation, and a relatively low room temperature viscosity. The high index is necessary to increase the external quantum efficiency of the device, while low absorption is required to reduce optical losses. The reduced room temperature viscosity is needed to provide stress relief in the glass due to the different thermal expansion coefficient of the high expansion glass and low expansion diode.

Studies on glasses in the arsenic, bromine and sulphur system indicate that these properties have conflicting compositional dependencies, e.g., compositional changes that increase the index of refraction, simultaneously increase the optical absorption and the viscosity. In spite of this, glasses have been found which have suitable values for all three properties. Phase-separating arsenic (As), bromine (Br), and sulphur (S) glass has been shown to have an unusually high index and low viscosity. More specifically, the glasses comprise by weight 31–48% arsenic, 8–25% bromine, and 38–50% sulphur.

To make the glasses, semiconductor grade materials are used. Care is exercised to reduce the amount of oxygen in the various constituents. Using an apparatus such as shown in FIG. 1, the solid ingredients to be included in the glass, in the proper amounts, are placed in an ampoule 10 under a dry inert gas, such as nitrogen. The ampoule is then evacuated to about $10^{-6}$ torr and flame sealed. During evacuation the ampoule is immersed in a Dry Ice-acetone bath so as to reduce volatilization of the bromine. The ampoule is then fired or heated in a furnace (not shown) for about 5 hours at temperatures between 550° and 700° C. (depending on the composition) and then cooled slowly. During firing, the furnace and ampoule were rocked in order to improve the homogeneity of the glass.

The ampoule 10 is made of a material such as quartz, so that after firing, the glass may be separated completely from the ampoule due to the large difference in their expansion coefficients. Glass formation may be determined visually by observing for light scattering which would indicate the presence of phase-separation. The composition of the glass, which generally deviated slightly from the batched composition, may be experimentally determined by X-ray fluorescence techniques.

Other techniques for preparing the glass were utilized. However, even though these glasses had similar batch compositions, phase-separated glass was not produced thereby. By phase-separated it is meant that the glass decomposes into two or more distinguishable phases. This way either takes the form of precipitation of a crystalline phase, i.e. devitrification, or separation on a micro-scale into two immiscible glassy phases. The controlling mechanism for producing phase-separated, or translucent glass, by the method hereinbefore described is not well understood, since glasses with the same compositional ingredients, when prepared under well controlled conditions, produced single phased or non-scattering glass. A possible explanation may be that the present method produces glass with less oxygen impurities which in turn somehow controls the phase-separation process of the chalcogenide glass.

Various glasses of varying compositions were made using the method described above. Two of these glasses exhibited phase separation. The first had 38% arsenic, 15% bromine, and 47% sulphur. This glass had an index of refraction of 2.5 with a density of 2.7 grams per cubic centimeter and a Vickers hardness of about 13. The second glass had an index of refraction of 2.4 with a density of 2.9 grams per cubic centimeter and a Vickers hardness of about 27.

The diodes may be encapsulated by forming a dome on the supports and around the diode by conventional means such as free flowing or by molding. In the free flowing method, the glass was broken into pieces of the correct weight for the particular diode. For most of the diodes studied, this weight was found to be about 25–30 milligrams. Although this is much larger than the theoretically required minimum weight of about 1 milligram, it was found that problems in positioning the glass and diode resulted in the minimum workable glass weight being 15–20 milligrams. Thus, in spite of the increased absorption losses inherent in using a larger size encapsulant, encapsulant domes weighing between 25 and 30 milligrams consistently provided the maximum radiant output.

Figure 2:
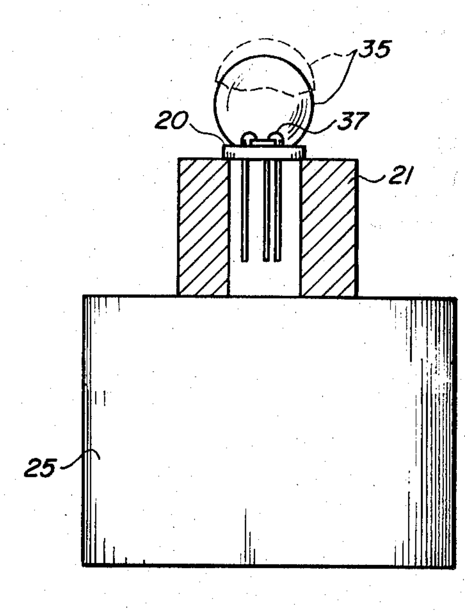
FIG. 2 is a schematic view showing a method for encapsulating the optical semiconductor device of the present invention.

After selection of the glass pieces, they were placed on a quartz plate. The temperature of the plate was increased until the glass softened and surface tension forces formed an approximately hemispherical dome. After cooling, the domes separated easily from the plate due to the large thermal expansion mismatch between the dome and the quartz. Once the dome was formed, the diode to be encapsulated was heated to approximately 170° C. The dome is then placed gently on the diode and the combined structure is allowed to cool to room temperature. Apparatus which may be used to encapsulate the diode is shown in FIG. 2. The diode 37 and support sub-assembly 20 is seated on a cylindrical support 21 which is mounted on a heater 25. The subassembly is heated in air to approximately 170° C. The pre-formed glass bead 35 is then placed on the heated subassembly over the semiconductor chip 37. The glass bead rapidly melts flowing around the chip and adhering to the support. If the bead is not properly centered on the chip, it can be gently pushed into position. After the diode is encapsulated, the assembly is heat treated by lowering the temperature to a predetermined level for a pre-determined period of time. This heat treatment enhances the phase-separation of the glass and is discussed more fully hereinafter. After heat treatment, the assembly is cooled slowly to room temperature.

The heat treatment to enhance the phase-separation appears to be dependent upon the composition of the glass used. Experimentally it was determined that the encapsulated diode should be heated to 30–50° C. for approximately 15–30 minutes. The upper limit of heat treatment is dependent upon the amount of heat to cause the phase-separated condition to become unstable such as when the glass becomes homogeneous, e.g. crystallites melting. The lower limit of heat treatment is related to initiation of further phase separation processes such as the creation of additional crystallites. For the 38% As: 15% Br: 47% S glass a heat treatment at 50° C. for 15 minutes is preferred.

Figure 3:
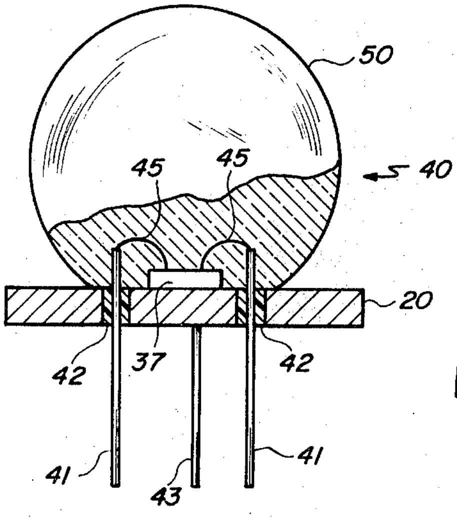
FIG. 3 is a sectional view of an embodiment of the optical semiconductor device of the present invention.

The diode encapsulated by the foregoing technique is illustrated in FIG. 3. The optical semiconductor device is generally designated as 40. The optical semiconductor device 40 comprises a support 20 which is shown to be a flat metal disk. An electroluminescent semiconductor chip 37 is mounted on the top surface of the support 20 and is secured thereto by a suitable solder. The electroluminescent chip 37 may be of any construction well known in the art. However, in general, such chips include adjacent P-type and N-type regions with a PN junction therebetween. The chip exhibits electroluminescence in the vicinity of the PN junction when the diode is biased so as to inject charge carriers of one type into a region where the predominant charge carriers are of the opposite type. Radiation is emitted in conjunction with the recombination of pairs of oppositely charged carriers. The chip 37 is mounted on the support 20 so that the radiation from the diode is emitted away from the support.

Terminal wires 41 extend through openings in the support 20 and project slightly above the top surface of the support. The terminal wires are secured to and electrically insulated from the support by washers 42 of an electrical insulating material, such as glass or ceramic. Each of the terminal wires 41 is electrically connected to a separate contact of the electroluminescent semiconductor 37 by a fine wire 45. The third terminal wire 43 is secured to the support 20 which is electrically connected to the semiconductor 37.

An encapsulant phase-separated glass dome 50 is mounted on and secured to the top surface of the support 20. The glass dome 50 extends over and is in intimate contact with the electroluminescent semiconductor 37 so that the radiation emitted by the diode passes through the glass dome. In the semiconductor device 40 shown in FIG. 2, the glass dome 50 is substantially spherical in shape.

In order to maximize the radiation emitted by an encapsulated device, reflections at the encapsulant-air interface should be minimized. This can most easily be accomplished by varying the encapsulant in shape in the shape of a hemisphere with the PN junction at its center; in this way the emitted radiation strikes the interface at near normal incidence. Since, however, the diode is not a point source, it is of interest to determine what the minimum radius for the encapsulant must be so that all existing radiation strikes the encapsulant-air interface at less than the critical angle.

Figure 4:
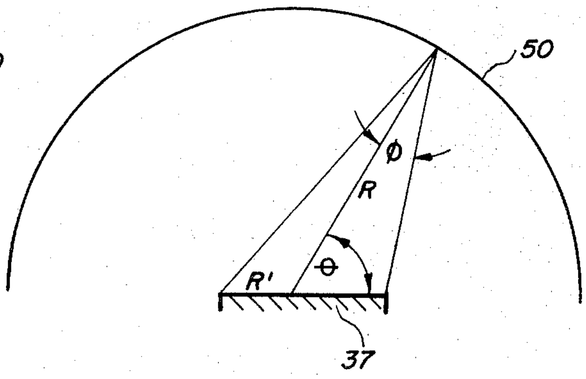
FIG. 4 is a schematic view showing the optical relation between the encapsulant and the semiconductor.

Assume a circular emitting area of radius R and an encapsulant hemisphere of radius R′, angle of incidence, $\varphi$, and central angle, $\theta$, as shown in FIG. 4. The angle of incidence is a maximum when the cosine of the central angle is equal to the ratio of the radius of the emitting area to the radius of the hemisphere $(R/R')$. The angle of incidence is then given by the following relation:

$$\varphi=\sin^{-1}(R/R')$$

Thus, in order to have all the rays strike the encapsulant-air interface at less than the critical angle for that interface, one must have $$\sin\varphi>\sin\theta=1/N_e,$$

where $N_e$ is the index of refraction of the encapsulant, i.e.

$$R'<R\times N_e.$$

Therefore, for typical junction radius of 0.04 centimeters and an encapsulant index of 2.5, the radius of encapsulant hemisphere should be greater than 0.1 centimeters.

Phase-separated chalcogenide glass encapsulants prepared and constructed as hereinbefore described exhibited the following properties which increased the efficiency and operability of solid state light-emitting diodes. These properties include:

(1) A high refractive index, in order to increase the external quantum efficiency;
(2) A low optical absorption at the wavelength of diode emission, in order to reduce absorption losses; and
(3) A suitable viscosity The last property is important for two reasons: firstly, the viscosity must be low enough to allow encapsulation of the diode at temperatures below 200° C.; secondly, since the thermal expansion coefficients of chalcogenide glasses are much higher than that of the diode, the room temperature viscosity must be low enough to allow viscous flow in the glass to relieve thermal stresses that arise during encapsulation. Yet it must be high enough so that the glass maintains its shape at room temperature.

It was found after extensive experimentation that changes in preparation procedure would affect the transparent quality of the glass produced. For example, when glass with the preferred composition was made in the conventional manner by firing the mixture in test tubes under a flowing inert gas, transparent glass was produced. Tests were conducted with phase-separated and single-phased, transparent glasses having 38% arsenic, 15% bromine, and 47% sulphur by weight. These glasses were used to encapsulate GaAsP red-emitting diodes. The results of these tests are shown in Table I below. The translucent glass had a higher index of refraction and a lower viscosity than the clear glass, thus making it more suitable for use in light-emitting diodes. In the table, the Vickers hardness, which is proportional to the viscosity, is listed instead of the viscosty due to the difficulty in measuring the latter. The lower viscosity and higher index of refraction is a completely unexpected result which is not fully understood since most glasses with a high index of refraction usually exhibit a high viscosity. The higher index of refraction increased the external quantum efficiency of the diode while the lower viscosity imparts better mechanical properties to the encapsulated diode. As can be seen by the table below, enhancement factors, i.e. the ratio of the output after and before encapsulation, obtained by encapsulating red-emitting GaAsP diodes with the clear and translucent glasses, clearly indicates that the translucent, phase-separated, or devitrified glass is more efficient than the clear or non-devitrified glass. This advantage is further increased by the heat treatment of the encapsulated diode. Similar improvements were realized when this glass was used to encapsulate an infrared-emitting GaAlAs diode. As the table indicates, encapsulation of the red-emitting diodes with the devitrifying glass has resulted in a greater than 7 fold increase in the external quantum efficiency, as well as a marked improvement over non-phase-separated or clear glasses.

TABLE I

Properties of Encapsulants and Ratio of Radiant Output of Encapsulated to Bare Red-Emitting Diodes

| Glass (38% As:15% Br:47% S) | Index of refraction ($N_e$) | Vickers hardness | Radiation enhancement factors for specified diode current | |
|---|---|---|---|---|
| | | | 10 ma. | 50 ma. |
| Non-devitrifying (clear) | 2.4 | 34 | 6.3 | 5.5 |
| Devitrifying: | | | | |
| Before heat treatment | 2.5 | 13 | 7.3 | 6.2 |
| After heat treatment | 2.5 | 13 | 8.2 | 6.5 |

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A method of making a translucent, partially devitrified phase-separated chalcogenide glass of a composition consisting essentially of, by weight, 31 to 48 percent arsenic, 8 to 25 percent bromine and 38 to 50 percent sulphur; which comprises the steps of:

(a) placing the constituents to form said glass in an ampoule;
(b) evacuating and sealing said ampoule;
(c) heating said ampoule to between 550° C. and 700° C. for about 5 hours; and
(d) slowly cooling said ampoule to room temperature to thereby afford a translucent, partially devitrified phase-separated glass of said composition having at least two distinguishable phases.

2. The method in accordance with claim 1 in which the constituents are placed into said ampoule under dry nitrogen gas.

3. The method in accordance with claim 2 in which the ampoule is evacuated to a pressure of about $10^{-6}$ torr.

4. The method in accordance with claim 1 in which the composition consists essentially of, by weight, 38 percent arsenic, 47 percent sulphur and 15 percent bromine.

5. The method in accordance with claim 1 in which the composition consists essentially of, by weight, 38 percent arsenic, 39 percent sulphur and 23 percent bromine.

6. A method of producing an encapsulated optical semiconductor device with a translucent, partially-devitrified phase-separated chalcogenide glass of a composition consisting essentially of, by weight, 31 to 48 percent arsenic, 8 to 25 percent bromine, and 38 to 50 percent sulphur and having at least two distinguishable phases, said method comprising the steps of:

(a) positioning a predetermined amount of said glass on top of said optical semiconductor device;

(b) heating said optical semiconductor device to approximately 170° C. which melts and causes said glass to flow thereby encapsulating said optical semiconductor device;

(c) heat treating said encapsulated optical semiconductor device between about 30° C. to about 50° C. for about 15 to about 30 minutes to enhance the phase-separation of said glass; and (d) slowly cooling said encapsulated optical semiconductor device to ambient conditions.

7. A method in accordance with claim 6 in which the composition consists essentially of, by weight, 38 percent arsenic, 47 percent sulphur, and 15 percent bromine and said heat treating step is conducted at 50° C. for fifteen minutes.

8. The method of claim 1 wherein said glass which results has both a high index of refraction and a low Vickers hardness.

9. The method of claim 1 wherein said glass which results has an index of refraction of about 2.5 and a Vickers hardness of about 13.

10. The method of claim 6 wherein said glass has both a high index of refraction and a low Vickers hardness.

11. The method of claim 6 wherein said glass has an index of refraction of about 2.5 and a Vickers hardness of about 13.

12. The method of claim 6 wherein said heat treatment of step (c) increases the radiant output of said encapsulated optical semiconductor device upon excitation over the radiant output of an encapsulated optical semiconductor device which is not heat treated in accordance with said step (c).

13. A method of producing an encapsulated optical semiconductor device comprising:

(a) positioning a predetermined amount of a translucent, partially devitrified phase-separated chalcogenide glass of a composition consisting essentially of, by weight, 31 to 48 percent arsenic, 8 to 25 percent bromine, and 38 to 50 percent sulphur and having at least two distinguishable phases, on top of said optical semiconductor device;

(b) heating said optical semiconductor device to approximately 170° C. which melts and causes said glass to flow thereby encapsulating said optical semiconductor device; and (c) slowly cooling said encapsulated optical semiconductor device to ambient conditions.

14. A method in accordance with claim 13 wherein said glass composition consists essentially of, by weight, 38 percent arsenic, 47 percent sulphur, and 15 percent bromine.

15. The method of claim 13 wherein said glass has both a high index of refraction and a low Vickers hardness.

16. The method of claim 13 wherein said glass has an index of refraction of about 2.5 and a Vickers hardness of about 13.

References Cited

UNITED STATES PATENTS

| | | | |
|---|---|---|---|
| 3,410,674 | 11/1968 | Martin | 65—43 X |
| 3,596,136 | 7/1971 | Fischer | 106—47 Q X |
| 3,144,318 | 8/1964 | Bruen et al. | 65—DIG. 11 |
| 3,338,728 | 8/1967 | Hilton et al. | 65—32 X |
| 2,961,350 | 11/1960 | Flaschen et al. | 317—234 F |
| 3,024,119 | 3/1962 | Flaschen et al. | 317—234 F |
| 2,889,952 | 6/1959 | Claypoole | 65—43 X |

S. LEON BASHORE, Primary Examiner

K. M. SCHOR, Assistant Examiner

U.S. Cl. X.R.

65—33, 43, DIG. 11, DIG. 15; 106—47 Q; 317—234 F